(12) United States Patent
Harada

(10) Patent No.: US 8,284,344 B2
(45) Date of Patent: Oct. 9, 2012

(54) PROTECTION PLATE INTEGRATED DISPLAY APPARATUS

(75) Inventor: Tatsuhito Harada, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 339 days.

(21) Appl. No.: 12/730,393

(22) Filed: Mar. 24, 2010

(65) Prior Publication Data

US 2010/0245707 A1    Sep. 30, 2010

(30) Foreign Application Priority Data

Mar. 27, 2009    (JP) ................................ 2009-079001

(51) Int. Cl.
G02F 1/1333    (2006.01)

(52) U.S. Cl. ...................................................... 349/58

(58) Field of Classification Search ................ 349/58
See application file for complete search history.

(56) References Cited

U.S. PATENT DOCUMENTS

| | | |
|---|---|---|
| 6,833,953 B2 | 12/2004 | Miyazawa et al. |
| 7,830,595 B2 | 11/2010 | Hinata et al. |
| 2006/0262260 A1 | 11/2006 | Majumdar et al. |
| 2007/0070477 A1 | 3/2007 | Eto et al. |
| 2007/0071909 A1 | 3/2007 | Eun et al. |
| 2007/0097299 A1 | 5/2007 | Watanabe et al. |
| 2007/0132911 A1 | 6/2007 | Fujiwara et al. |
| 2007/0252922 A1 | 11/2007 | Oohira |
| 2007/0267134 A1 | 11/2007 | Konarski et al. |
| 2008/0106675 A1 | 5/2008 | Uesaka et al. |
| 2008/0297685 A1* | 12/2008 | Sugibayashi et al. ........... 349/58 |
| 2009/0011197 A1 | 1/2009 | Matsuhira |
| 2009/0086123 A1* | 4/2009 | Tsuji et al. ....................... 349/58 |
| 2010/0149452 A1 | 6/2010 | Harada et al. |
| 2010/0231821 A1 | 9/2010 | Tsuji et al. |

(Continued)

FOREIGN PATENT DOCUMENTS

JP    3-204616    9/1991

(Continued)

OTHER PUBLICATIONS

Related U.S. Appl. No. 12/236,696, filed Sep. 24, 2008; Display Device Integral With Protection Plate and Display Apparatus Using the Same; M. Tsuji et al.

(Continued)

*Primary Examiner* — Uyen Chau N Le
*Assistant Examiner* — Chris Chu
(74) *Attorney, Agent, or Firm* — Holtz, Holtz, Goodman & Chick, PC

(57) ABSTRACT

A protection plate integrated liquid crystal display panel, including: a liquid crystal display panel having an optical sheet stuck thereto so as to be overlapped with the whole of a screen area; a protection plate arranged to be opposed to the optical sheet of the liquid crystal display panel; a spacer including a first layer arranged on an outside of the screen area between the optical sheet and the protection plate and a second layer arranged between the first layer and the protection plate; and a resin layer filled up and polymerized between the liquid crystal display panel and the protection plate in an area enclosed with the spacer. The first layer is formed to extend from an inner area of a periphery of the optical sheet to the external area of the same, and the second layer is discontinuously arranged on the first layer.

21 Claims, 6 Drawing Sheets

U.S. PATENT DOCUMENTS

| | | |
|---|---|---|
| 2010/0231837 A1 | 9/2010 | Harada et al. |
| 2011/0070799 A1 | 3/2011 | Tsuji et al. |

FOREIGN PATENT DOCUMENTS

| | | |
|---|---|---|
| JP | 6-337411 A | 12/1994 |
| JP | 8-6503 A | 1/1996 |
| JP | 2529118 Y2 | 3/1997 |
| JP | 10-214032 A | 8/1998 |
| JP | 11-174417 | 7/1999 |
| JP | 11-174417 A | 7/1999 |
| JP | 2000-075306 | 3/2000 |
| JP | 2000-221512 A | 8/2000 |
| JP | 2002-347155 A | 12/2002 |
| JP | 2003-215344 | 7/2003 |
| JP | 2005-055641 | 3/2005 |
| JP | 2005-55641 A | 3/2005 |
| JP | 2005-114789 A | 4/2005 |
| JP | 2005-179481 A | 7/2005 |
| JP | 2006-163742 A | 6/2006 |
| JP | 2006-189715 A | 7/2006 |
| JP | 2006-195209 A | 7/2006 |
| JP | 2007-114737 A | 5/2007 |
| JP | 2007-164154 A | 6/2007 |
| JP | 2008-170753 A | 7/2008 |
| JP | 2008-241728 A | 10/2008 |
| JP | 2008-281997 A | 11/2008 |
| JP | 2009-008703 | 1/2009 |
| JP | 2009-069333 A | 4/2009 |
| JP | 2009-075217 A | 4/2009 |
| JP | 2009-086187 | 4/2009 |
| JP | 2009-086188 A | 4/2009 |
| JP | 2009-109855 A | 5/2009 |
| JP | 2009-175701 A | 8/2009 |
| KR | 100465678 B1 | 12/2004 |
| KR | 10-2008-0032116 A | 4/2008 |

OTHER PUBLICATIONS

Related U.S. Appl. No. 12/632,974, filed Dec. 8, 2009; Liquid Crystal Display Apparatus and Manufacturing Method Thereof; T. Harada et al.

Japanese Office Action dated Apr. 12, 2011, and English translation thereof, issued in counterpart Japanese Application No. 2009-079001.

U.S. Appl. No. 12/955,856; First Named Inventor: Masaki Tsuji; Title: "Display Device Integral With Protection Plate, and Display Apparatus Using the Same"; Filed Nov. 29, 2010.

U.S. Appl. No. 12/632,974; First Named Inventor: Tatsuhito Harada; Title: "Liquid Crystal Display Apparatus and Manufacturing Method Thereof"; Filed Dec. 8, 2009.

U.S. Appl. No. 12/721,611; First Named Inventor: Tatsuhito Harada; Title: "Protective Plate Integrated Display Apparatus"; Filed Mar. 11, 2010.

U.S. Appl. No. 12/721,658; First Named Inventor: Masaki Tsuji; Title: "Protective Plate Integrated Display Apparatus"; Filed Mar. 11, 2010.

* cited by examiner

PROTECTION PLATE INTEGRATED DISPLAY APPARATUS

CROSS-REFERENCE TO RELATED APPLICATIONS

This application is based upon and claims the benefit of priority under 35 USC 119 of Japanese Patent Application No. 2009-079001 filed on Mar. 27, 2009, the entire disclosure of which, including the description, claims, drawings, and abstract, is incorporated herein by reference in its entirety.

BACKGROUND OF THE INVENTION

1. Field of the Invention

The present invention relates to a protection plate integrated liquid crystal display panel and an electronic equipment.

2. Description of the Related Art

A protection plate integrated display apparatus constructed by attaching a viewing screen protection plate to a liquid crystal display panel, equipped with a front polarizing plate on the surface of a front glass plate, with a spacer intervening between the viewing screen protection plate and the liquid crystal display panel with an adhesive filled in a gap between them is known as disclosed in, for example, Japanese Patent Application Laid-Open Publication No. 2005-55641. It would appear that the adhesive, which is an un-polymerized resin filled in the gap between the liquid crystal display panel and the viewing screen protection plate, sometimes contacts with the surroundings of the joining area of the polarizing plate, provided on the liquid crystal display panel, and a glass substrate at the time of manufacturing the conventional protection plate integrated liquid crystal display panel. In this case, it is apprehended that a defect, such as a crack, is produced in the polarizing plate of the liquid crystal display panel as the time passes after the manufacturing thereof.

BRIEF SUMMARY OF THE INVENTION

According to a first aspect of the present invention, there is provided a protection plate integrated liquid crystal display panel, including: a liquid crystal display panel including a first and second transparent substrates, a liquid crystal layer provided between the first and second transparent substrates, and an optical sheet that is stuck to the first transparent substrate so as to be overlapped with the whole of a screen area and is formed to be larger than the screen area; a protection plate arranged to be opposed to the liquid crystal display panel with the optical sheet intervening between the protection plate and the first transparent substrate; a spacer including at least a first layer arranged on an outside of the screen area between the optical sheet and the protection plate so as to be overlapped with the whole of at least one end side of the optical sheet from an area in which the first layer overlaps with the optical sheet to an area on an outside of the optical sheet, and a second layer arranged on the outside of the screen area between the first layer and the protection plate; and a resin layer filled up and polymerized between the liquid crystal display panel and the protection plate so as to be overlapped with the whole of the screen area from an area in which the spacer is arranged to an area in which the resin layer overlaps with the screen area, wherein the first layer is continuously formed along the whole of at least one end side of the optical sheet in a contact area overlapping with a part in which the first layer directly contacts with the optical sheet, the first layer continuously formed along the whole of at least one end side of the optical sheet in a noncontact area adjoining the contact area, the first layer being not contacted with the optical sheet in the noncontact area, the first layer formed to extend from a boundary line between the contact area and the noncontact area to the area on the outside of the optical sheet in the noncontact area, and the second layer is discontinuously arranged on the first layer in the contact area or the noncontact area.

According to a second aspect of the present invention, there is provided a protection plate integrated liquid crystal display panel, including: a liquid crystal display panel including a first and second transparent substrates, a liquid crystal layer provided between the first and second transparent substrates, and an optical sheet that is stuck to the first transparent substrate so as to be overlapped with the whole of a screen area and is formed to be larger than the screen area; a protection plate arranged to be opposed to the liquid crystal display panel with the optical sheet intervening between the protection plate and the first transparent substrate; a spacer including at least a first layer arranged on an outside of the screen area between the optical sheet and the protection plate so as to be overlapped with the whole of an outer periphery of the optical sheet from an area in which the first layer overlaps with the optical sheet to an area on an outside of the optical sheet, the whole of the first layer formed in a continuous frame, and a second layer arranged on the outside of the screen area between the first layer and the protection plate; and a resin layer filled in an area enclosed by the spacer and polymerized therein between the liquid crystal display panel and the protection plate, wherein the first layer is formed in a frame continuously enclosing the screen area in a contact area overlapping with a part in which the first layer directly contacts with the optical sheet, the first layer formed in a shape of extending from the contact area to the area on the outside of the optical sheet in a noncontact area adjoining the contact area, the first layer being not contacted with the optical sheet, the first layer formed in a shape of extending from a boundary line between the contact area and the noncontact area to the area on the outside of the optical sheet in the noncontact area, and the second layer is discontinuously arranged on the first layer in the contact area or the noncontact area.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention

DETAILED DESCRIPTION OF THE INVENTION

Embodiments of the present invention will be explained with reference to the drawings.

First Embodiment

Figure 1:
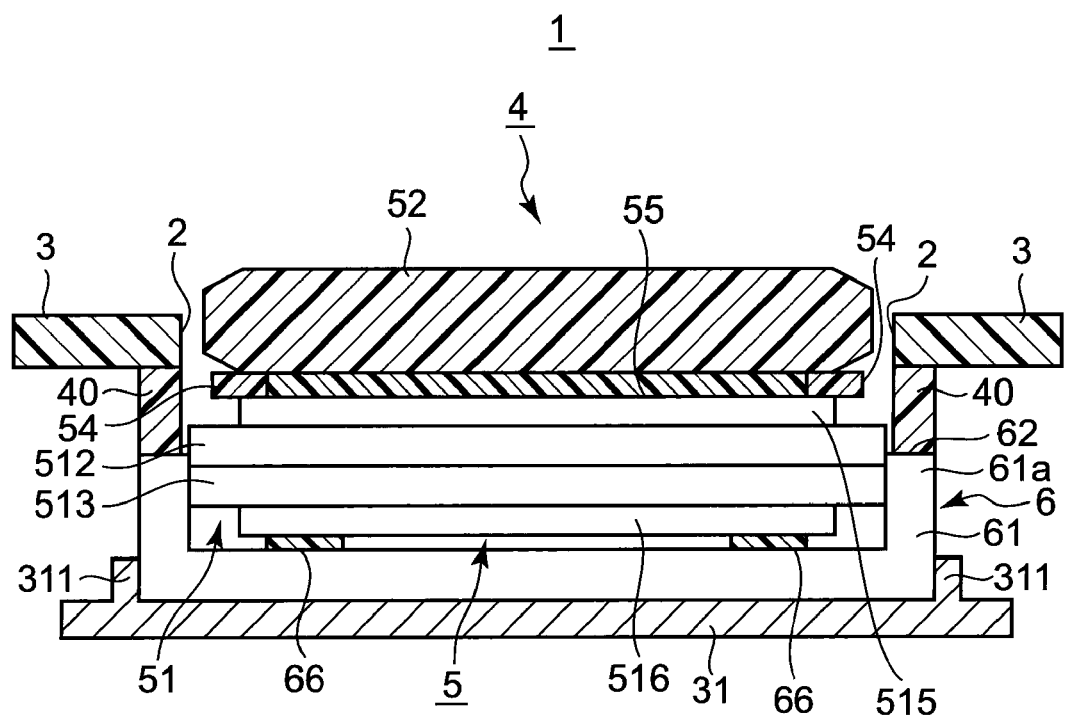
FIG. 1 is a sectional view showing the schematic configuration of electronic equipment on which a protection plate integrated liquid crystal display panel of a first embodiment is mounted.

FIG. 1 is a sectional view showing the schematic configuration of an electronic equipment on which a protection plate integrated liquid crystal display panel of a first embodiment is mounted. The electronic equipment 1 is a cellular phone handset, a digital camera, an electronic notebook, or the like, and is equipped with a housing 3 having an aperture part 2 for display, which aperture part 2 has a predetermined size, and a liquid crystal display module 4 housed in the housing 3 correspondingly to the aperture part 2, as shown in FIG. 1.

The liquid crystal display module 4 includes a protection plate integrated liquid crystal display panel 5 and a surface light source unit 6 irradiating an irradiating light toward the protection plate integrated liquid crystal display panel 5. In the following, the side (the upper side in FIG. 1) of a pair of transparent substrates 512 and 513 of the protection plate integrated liquid crystal display panel 5 which side is opposite to the one on which the surface light source unit 6 is arranged will be referred to as a "viewing side."

Figure 2:
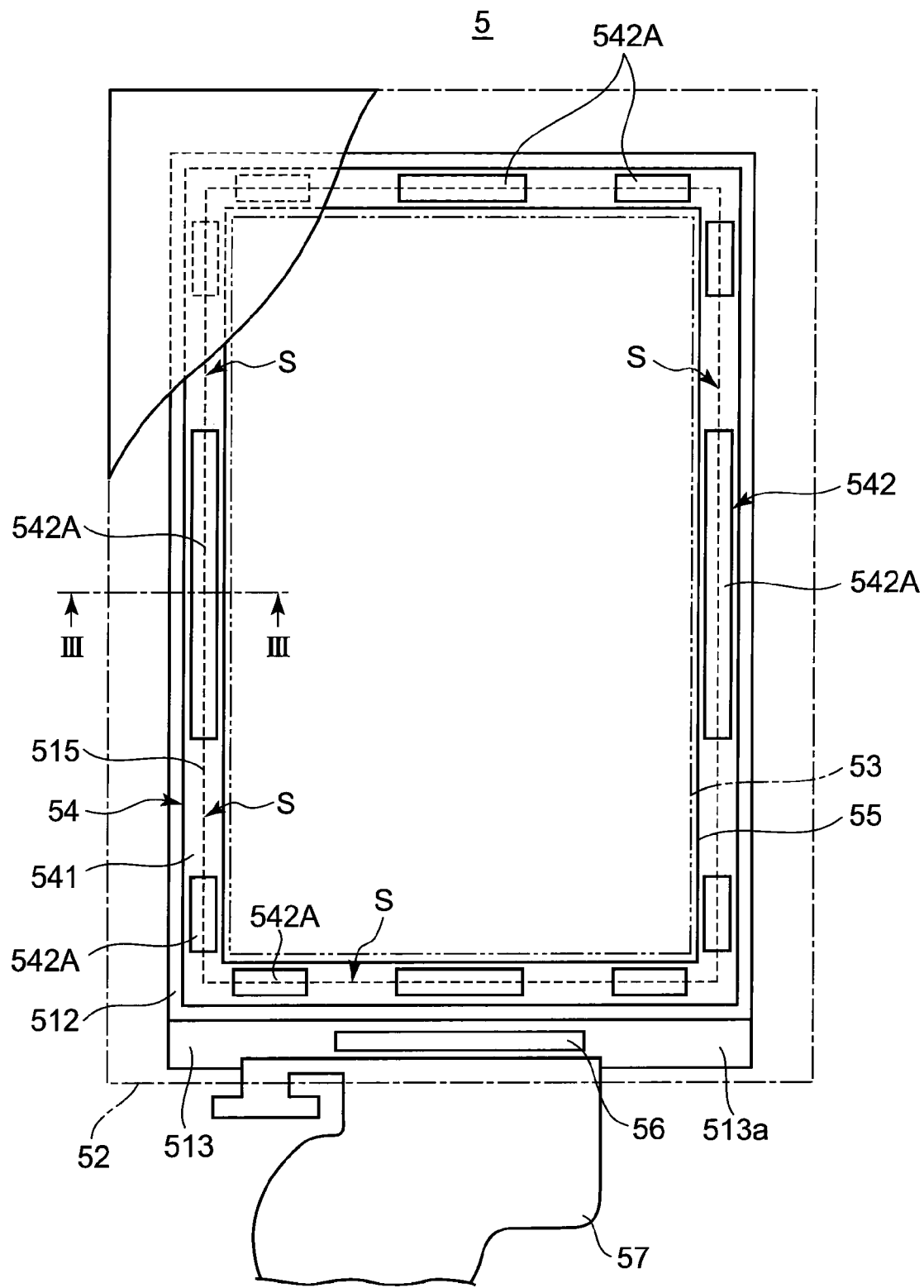
FIG. 2 is a front view showing the schematic configuration of the protection plate integrated liquid crystal display panel equipped in the electronic equipment of FIG. 1.

In the following, the protection plate integrated liquid crystal display panel 5 will be described in detail. FIG. 2 is a front view showing the schematic configuration of the protection plate integrated liquid crystal display panel 5, and FIG. 3 is a sectional view thereof viewed from a cutting plane line III-III in FIG. 2.

Figure 3:
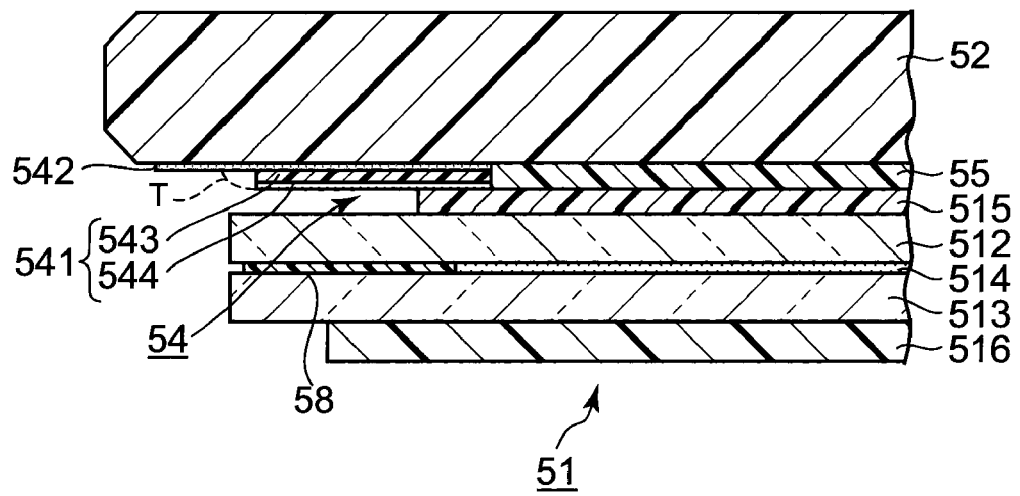
FIG. 3 is a sectional view of the protection plate integrated liquid crystal display panel viewed from a cutting plane line III-III in FIG. 2.

As shown in FIGS. 2 and 3, the protection plate integrated liquid crystal display panel 5 is equipped with a liquid crystal display panel 51 for displaying an image thereon, a viewing screen protection plate 52 arranged on the viewing side of the liquid crystal display panel 51 with a predetermined gap between the liquid crystal display panel 51 and the viewing screen protection plate 52, a spacer 54 provided between the liquid crystal display panel 51 and the viewing screen protection plate 52 to enclose the screen area 53 of the liquid crystal display panel 51 for keeping the gap between the liquid crystal display panel 51 and the viewing screen protection plate 52, which spacer 54 has the whole shape of a continuously formed almost rectangular frame, and a resin layer 55 filled in the area surrounded by the spacer 54.

The liquid crystal display panel 51 is equipped with the pair of transparent substrates 512 and 513 arranged to be opposed to each other on the viewing side and the opposite side thereof with a predetermined gap between them, a liquid crystal layer 514 enclosed in the gap between these transparent substrates 512 and 513, first and second transparent electrodes (not shown) arranged on the inner surfaces of the pair of transparent substrates 512 and 513, respectively, which surfaces face with each other, for forming a plurality of pixels to control the transmission of light by changing the alignment states of the liquid crystal molecules of the liquid crystal layer 514 by applying voltages thereto, an optical sheet 515 stuck onto the external surface of the transparent substrate 512 on the viewing side, and a polarizing plate 516 stuck onto the external surface of the transparent substrate 513 on the opposite side.

The liquid crystal display panel 51 is an active matrix liquid crystal device using thin film transistors (TFTs) as active elements. Although the illustration of the followings is omitted in the drawings, the inner surface of one transparent substrate (for example, the transparent substrate 513 on the opposite side) between the pair of transparent substrates 512 and 513 is provided with a plurality of pixel electrodes (first electrodes) formed to be arranged in a matrix in row and column directions, a plurality of TFTs arranged correspondingly to the plurality of pixel electrodes, respectively, to be connected to the corresponding pixel electrode, a plurality of scanning lines, each supplying a gate signal to the plurality of TFTs in each row, and a plurality of signal lines, each supplying a data signal to the plurality of TFTs in each column. On the other hand, the inner surface on the other transparent substrate (for example, the transparent substrate 512 on the viewing side) is provided with a counter electrode (second electrode) formed to be opposed to the whole arrangement area of the plurality of pixel electrodes and color filters of three colors of red, green and blue, each formed correspondingly to each of the plurality of pixels composed of the areas in which the plurality of pixel electrodes and the counter electrode are opposed to each other.

As shown in FIG. 2, a projecting part 513a projecting to the outward of the transparent substrate 512 on the viewing side is formed at one end of the transparent substrate 513 on the opposite side. A driver device 56 applying gate signals to the plurality of scanning lines in order and applying data signals to the plurality of signal lines is mounted on the projecting part 513a. Furthermore, a wiring film 57 supplying a driver control signal from a not shown external circuit to the driver device 56 is connected to the end of the projecting part 513a.

The pair of transparent substrates 512 and 513 is joined to each other with a frame-shaped seal material 58 sandwiched between the transparent substrates 512 and 513 to enclose the screen area 53, in which the plurality of pixels is arranged in the matrix. The liquid crystal layer 514 is enclosed in the area surrounded by the seal material 58 in the gap between these transparent substrates 512 and 513.

Moreover, an alignment film (not shown) covering the electrodes is formed on the inner surface of each of the pair of transparent substrates 512 and 513, and the liquid crystal molecules of the liquid crystal layer 514 are kept to be aligned in their initially aligned states by the alignment film.

The liquid crystal display panel 51 may be any of a TN type or STN type liquid crystal display panel, in which liquid crystal molecules are aligned by twist alignment between the pair of transparent substrates 512 and 513, a vertically aligned type liquid crystal display panel, in which liquid crystal molecules are aligned to be substantially vertical to the transparent substrates 512 and 513, a non-twist horizontally-aligned type liquid crystal display panel, in which liquid crystal molecules are arranged in one direction to be aligned to be substantially parallel to the inner surfaces of the transparent substrates 512 and 513, a bend alignment type liquid crystal display panel, in which liquid crystal molecules are aligned by bend alignment, and the like. Moreover, the liquid crystal display panel 51 may also be a ferroelectric or anti-ferroelectric liquid crystal display panel.

The above-mentioned liquid crystal display panel 51 is adapted to provide the plurality of pixel electrodes onto the inner surface of the transparent substrate 513 on the opposite side, and to provide the counter electrode onto the inner surface of the transparent substrate 512 on the viewing side. In addition to this type, the liquid crystal display panel may be, for example, a lateral electric field control type one, which is equipped with a plurality of first electrodes for forming a plurality of pixels arranged in a matrix on the inner surface of the transparent substrate of one of the pair of transparent substrates 512 and 513, a second electrode including a plurality of elongated electrode units formed on the liquid crystal layer side or the other transparent substrate side of the first electrodes to be insulated from the first electrodes, a plurality of TFTs, each arranged correspondingly to each of the plurality of first electrodes to be connected to the corresponding first electrode, a plurality of scanning lines, each supplying a gate signal to the plurality of TFTs on each row, and a plurality of signal lines, each supplying a data signal to the plurality of TFTs on each column, which lateral electric field control type liquid crystal display panel generates a lateral electric field (an electric field in the direction along a substrate surface) between the plurality of first electrodes and the second electrode to change the alignment states of the liquid crystal molecules thereof.

Moreover, the optical sheet 515 is composed of a polarizing plate (hereinafter referred to as a viewing side polarizing plate) with a polarizing layer sandwiched between protective films and a wave plate provided for improving the viewing angle characteristic of the liquid crystal display panel 51 and the like to be formed by being stacked on the surface of the viewing side polarizing plate which surface is opposed to the transparent substrate 512 on the viewing side. As shown in FIG. 2, the optical sheet 515 is formed to be an approximate rectangle which is smaller than the external form of the transparent substrate 512 on the viewing side and is larger than the screen area 53. The optical sheet 515 is stuck in the area excluding the peripheral part of the transparent substrate 512 lest the optical sheet 515 should overlap with the peripheral part. On the other hand, the polarizing plate 516 is formed in the shape substantially same as that of the optical sheet 515, and is stuck in the area excluding the peripheral part and the projecting part 513a of the transparent substrate 513 on the opposite side.

The viewing screen protection plate 52 is formed of a tempered glass plate or a high-strength transparent resin plate. The viewing screen protection plate 52 is formed so as to have a size of covering the whole of the transparent substrate 512 on the viewing side of the liquid crystal display panel 51. To put it concretely, the viewing screen protection plate 52 is formed to have a shape larger than the external form of the transparent substrate 512 on the viewing side of the liquid crystal display panel 51, and is arranged to be opposed to the external surface of the optical sheet 515 (the external surface of the viewing side polarizing plate) and the external surface of the peripheral part exposed from the optical sheet 515.

The spacer 54, the whole of which is continuously formed to be in an almost rectangular frame, is provided in the area enclosing the screen area 53 of the liquid crystal display panel 51, and is closely contacted with each of the surfaces of the optical sheet 515 and the viewing screen protection plate 52 which surfaces are opposed to each other. The spacer 54 has a thickness corresponding to the layer thickness of the resin layer 55 provided between the liquid crystal display panel 51 and the viewing screen protection plate 52. The spacer 54 is equipped with a base 541 contacting with the optical sheet 515 directly, the whole of which base 541 is a continuously formed to be almost rectangular frame, and a second adhesive layer 542 provided between the base 541 and the viewing screen protection plate 52. The base 541 includes a sheet-shaped reflection suppression member 543 suppressing the reflection of external light, which reflection suppression member 543 is made of, for example, polyethylene terephthalate (PET), and a first adhesive layer 544 stacked on the surface of the reflection suppression member 543 on the side of the optical sheet 515. As shown in FIG. 3, the spacer 54 is arranged so that the base 541 and the second adhesive layer 542 may overlap with the whole of the outer periphery of the optical sheet 515 from the top of the optical sheet 515 to the area on the outside of the optical sheet 515. Accordingly, the base 541 is formed to be equal to or longer than the whole length of one side (end side) of the optical sheet 515 at each side of the optical sheet 515, and the base 541 is arranged to overlap with the whole of the end side along the whole of the end side. Moreover, as shown in FIG. 2, the base 541 is provided to overlap with the whole of the outer periphery of the optical sheet 515 from the top of the optical sheet 515 to the area on the outside of the optical sheet 515. The base 541 is provided to enclose the screen area 53 lest the base 541 should overlap with the screen area 53 in the state in which the whole of the base 541 is continuous. On the other hand, the second adhesive layer 542 is provided between the base 541 and the viewing screen protection plate 52 so as to overlap with the whole of the outer periphery of the optical sheet 515 from the top of the optical sheet 515 to the area on the outside of the optical sheet 515. The second adhesive layer 542 is discontinuously provided lest the second adhesive layer 542 should overlap with the screen area 53 in the state in which the second adhesive layer 542 encloses the screen area 53. That is, as shown in FIG. 2, the second adhesive layer 542 is formed of a plurality of island-shaped parts 542A separated from each other to be arranged along the base 541 with intervals S. Each of the intervals S in the second adhesive layer 542 functions as a gap for enabling the area on the inside of the second adhesive layer 542 to communicate with the area on the outside thereof.

The resin layer 55 is made of, for example, a thermally polymerizable resin, and is filled in an area, which is a gap between the liquid crystal display panel 51 and the viewing screen protection plate 52 and is enclosed by the spacer 54. The liquid crystal display panel 51 and the viewing screen protection plate 52 are fixed to each other with the second adhesive layer 542 and the first adhesive layer 544, and are more solidly joined to each other by the polymerization of the filled resin layer 55.

As shown in FIG. 1, the surface light source unit 6 is arranged to be fixed to a supporting part 31 provided in the housing 3 when the protection plate integrated liquid crystal display panel 5 is housed in the housing 3 so that the viewing screen protection plate 52 may be arranged in the aperture part 2 of the housing 3. A plurality of locating protrusions 311 abutting against the outer peripheral surface of a frame-shaped member 61 of the surface light source unit 6 is provided on the supporting part 31. The frame-shaped member 61 of the surface light source unit 6 is fixed to the locating protrusions 311 with fixing means such as fixing with a screw.

Moreover, a sealing frame 40 for preventing dust from entering the inside of the housing 3 from the gap between the peripheral surface of the aperture part 2 and the outer peripheral surface of the viewing screen protection plate 52 is provided between the peripheral wall part 61a of the frame-shaped member 61 of the surface light source unit 6 and the peripheral part of the aperture part 2 of the housing 3. The sealing frame 40 is made of an elastic material, such as sponge, and is sandwiched between the opposed surfaces of the inner surface of the housing 3 and the top surface 62 of the peripheral wall part 61a of the frame-shaped member 61 in the state of being compressed to some extent with one surface of the sealing frame 40 stuck onto one of the opposed surfaces and the other surface thereof contacted to the other surface of the opposed surfaces.

Next, a manufacturing process of the electronic equipment 1 will be described.

First, the spacer 54 is stuck onto the surface on the viewing side of the liquid crystal display panel 51 so that the optical sheet 515 may intervene between the viewing screen protection plate 52 and the liquid crystal display panel 51 at the time of assembling the protection plate integrated liquid crystal display panel 5. After that, an un-polymerized resin (a resin liquid including a thermally polymerizable resin or a solvent) is supplied into the area enclosed by the spacer 54 on the surface on the viewing side of the liquid crystal display panel 51 with means, such as dripping with a dispenser, transferring, and screen printing. Then, the viewing screen protection plate 52 is superposed on the supplied un-polymerized resin to be pressurized. If the un-polymerized resin includes a solvent, the viewing screen protection plate 52 is superposed thereon after the solvent has been vaporized and then pressurized.

The un-polymerized resin is pushed to be widened and filled into the whole area enclosed by the spacer 54 by the viewing screen protection plate 52, which is stuck to the spacer 54 in turn. When the un-polymerized resin is pushed to be widened, the air existing in the area enclosed by the spacer 54 between the liquid crystal display panel 51 and the viewing screen protection plate 52 passes through the intervals S (gaps) in the spacer 54, and the area is led to be deaerated. When the un-polymerized resin is filled in the area, the un-polymerized resin is led to protrude from the intervals S (see dotted line part T in FIG. 3), although the protrusion amount is small. Even if the un-polymerized resin protrudes in this way, it can be prevented that the un-polymerized resin flows out to the side of the optical sheet 515 to adhere to the end face of the optical sheet 515, because the base 541 of the spacer 54 is arranged so as to overlap with the whole of the outer periphery of the optical sheet 515 from the top of the optical sheet 515 to the area on the outside of the optical sheet 515 and the base 541 extends outward from the optical sheet 515.

Then, after the un-polymerized resin has been filled in the aforesaid area and the viewing screen protection plate 52 has been stuck to the spacer 54, the un-polymerized resin is heated in this state to be polymerized. Thus the resin layer 55 is formed.

The supply amount of the un-polymerized resin is set so that the quantity of the resin after the vaporization of the solvent may correspond to the volume of the area enclosed by the spacer 54 between the liquid crystal display panel 51 and the viewing screen protection plate 52.

After the assembly of the protection plate integrated liquid crystal display panel 5, the protection plate integrated liquid crystal display panel 5 and the surface light source unit 6 are integrated to form the liquid crystal display module 4. To put it concretely, the peripheral part of the surface of the protection plate integrated liquid crystal display panel 5 on the opposite side to the viewing side thereof is fixed to the inner bottom part of the surface light source unit 6 with double-coated adhesive tapes 66, and thereby the protection plate integrated liquid crystal display panel 5 and the surface light source unit 6 are integrated with each other. Then, the liquid crystal display module 4 is housed in the housing 3 so that the viewing screen protection plate 52 may be arranged in the aperture part 2 of the housing 3. At the time of the housing of the liquid crystal display module 4, the sealing frame 40 intervenes between the peripheral wall part 61a of the frame-shaped member 61 of the surface light source unit 6 and the peripheral part of the housing 3 around the aperture part 2. Then, the frame-shaped member 61 of the surface light source unit 6 is fixed to the locating protrusions 311 of the housing 3, and thereby the assembly of the electronic equipment 1 is completed.

As described above, according to the present embodiment, because the second adhesive layer 542 of the spacer 54 is formed so that the plurality of island-shaped parts 542A separated from each other with the intervals S is arranged along the base 541, the inter area and the outer area of the second adhesive layer 542 are led to communicate with each other through the intervals S. Thereby, if the un-polymerized resin in the area enclosed by the spacer 54 is pushed to be widened at the time of assembly, the air in the area passes through the intervals S, and the area is led to be deaerated. Moreover, because the base 541 of the spacer 54 is arranged so as to overlap with the whole of the outer periphery of the optical sheet 515 from the top of the optical sheet 515 to the area of the outside of the optical sheet 515, it can be prevented that the un-polymerized resin pushed to be widened in the area may flow out to the side of the optical sheet 515 to adhere to the end face of the optical sheet 515. Thereby, the liquid crystal display panel 51 and the viewing screen protection plate 52 can be joined with each other with the exertion of the harmful influences on the optical sheet 515 by the resin layer 55 suppressed.

Moreover, because the reflection suppression member 543 is provided to the base 541 of the spacer 54, the reflections of external lights can be suppressed, and it becomes possible to display images on which the influences of the external lights are suppressed.

Then, when the protection plate integrated liquid crystal display panel 5 is housed in the housing 3 so that the viewing screen protection plate 52 may be arranged in the aperture part 2 of the housing 3, the surface light source unit 6 is arranged by being fixed to the supporting part 31 provided in the housing 3, and consequently the protection plate integrated liquid crystal display panel 5 and the surface light source unit 6 can be housed in the housing 3 at one time.

Second Embodiment

Figure 4:
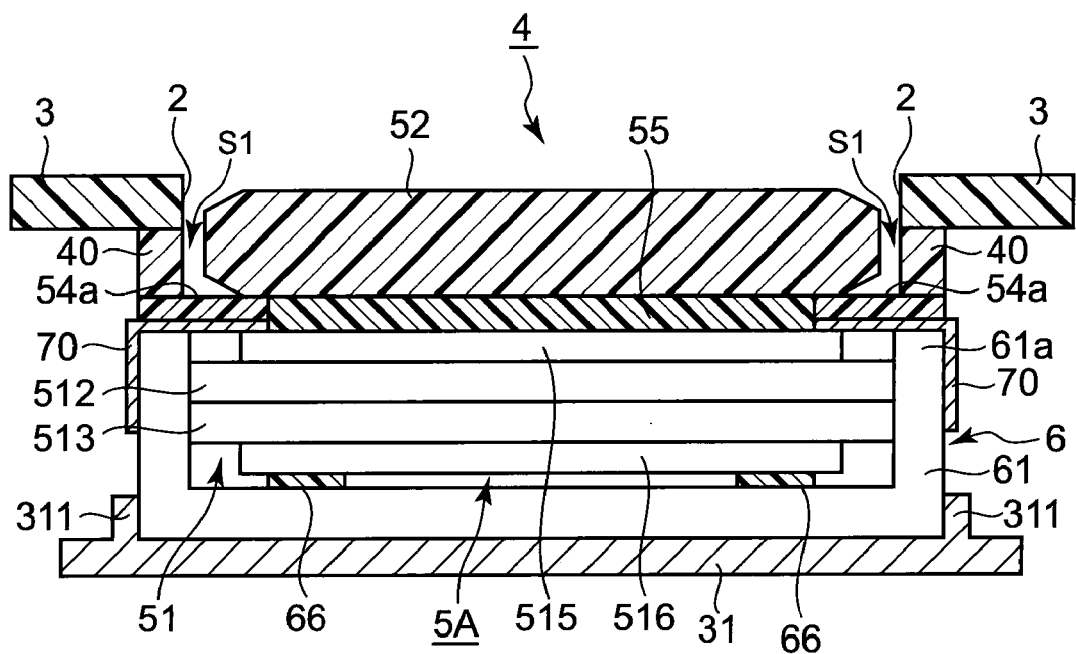
FIG. 4 is a sectional view showing the schematic configuration of electronic equipment on which a protection plate integrated liquid crystal display panel of a second embodiment is mounted.
Figure 5:
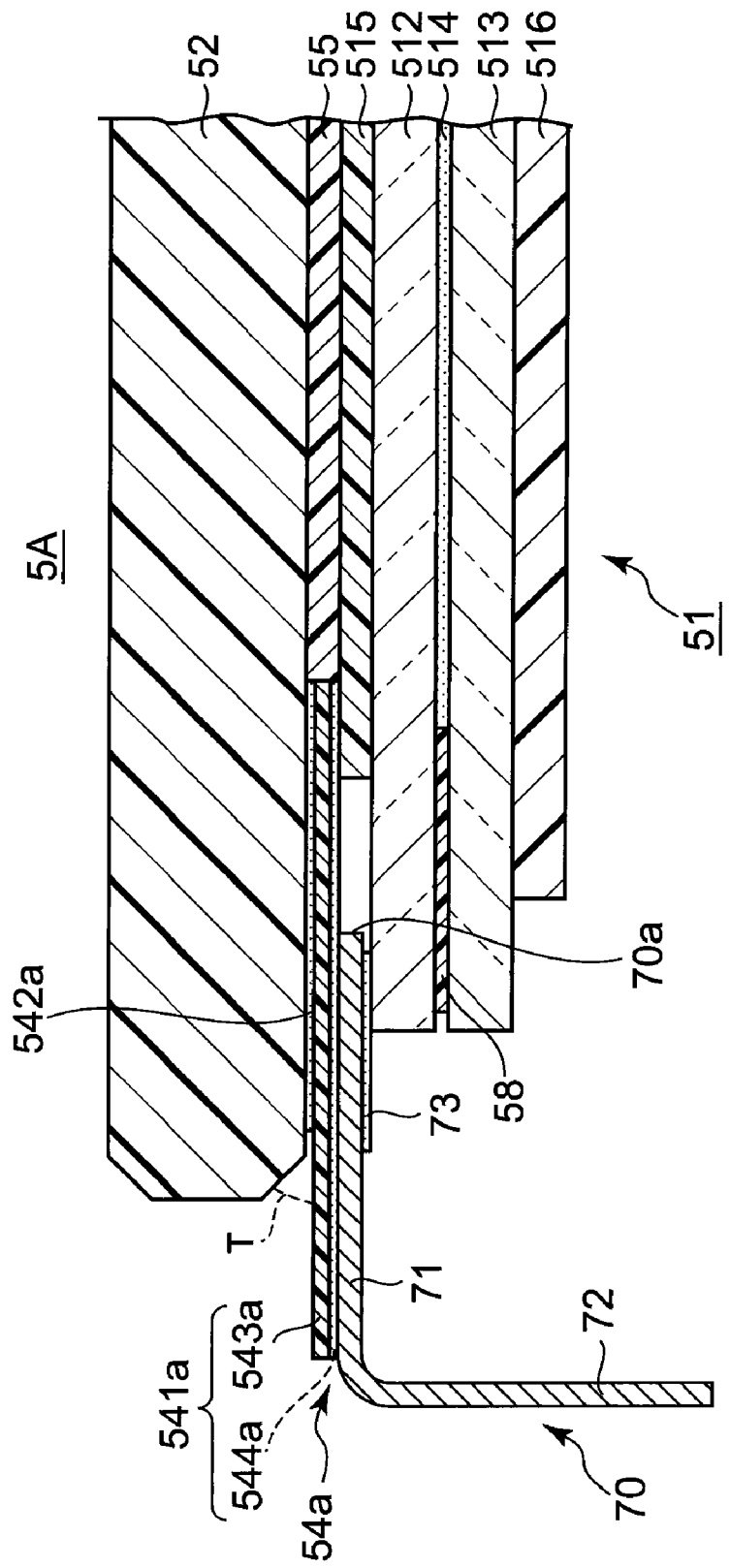
FIG. 5 is an enlarged sectional view showing a part of the protection plate integrated liquid crystal display panel equipped in the electronic equipment of FIG. 4.

FIG. 4 is a sectional view showing the schematic configuration of electronic equipment on which a protection plate integrated liquid crystal display panel of a second embodiment is mounted. FIG. 5 is a sectional view showing a part of the protection plate integrated liquid crystal display panel equipped in the electronic equipment of FIG. 4. In the following description, the same parts as those of the first embodiment will be denoted by the same marks as those of the first embodiment, and their descriptions will be omitted.

As shown in FIGS. 4 and 5, the protection plate integrated liquid crystal display panel 5A of the electronic equipment 1A of the second embodiment is provided with a pressing member 70 fixed at a position on the outside of the screen area 53 at the top of the transparent substrate 512 on the viewing side of the liquid crystal display panel 51 at which position the pressing member 70 overlaps with the viewing screen protection plate 52. The pressing member 70 includes an aperture part 70a, and the pressing member 70 is arranged so that the whole of the periphery of the aperture part 70a may overlap with the transparent substrate 512 on the viewing side. The pressing member 70 is formed and arranged to be a shape to overlap with the whole of the outer periphery of the transparent substrate 512 on the viewing side from the top of the transparent substrate 512 on the viewing side to the area of the outside of the transparent substrate 512 on the viewing side.

The pressing member 70 is a metallic frame-shaped shielding case, and includes a display device pressing part 71 abutting against the peripheral part of the surface of the viewing side of the transparent substrate 512 on the viewing side of the liquid crystal display panel 51, and a frame-shaped member attaching part 72 bent to the opposite side to the viewing side against the display device pressing part 71. The frame-shaped member attaching part 72 is fitted onto the outer peripheral surface of the frame-shaped member 61 of the surface light source unit 6, and is fixed thereto by, for example, means for fixing with a screw.

Moreover, as shown in FIG. 5, a double-coated adhesive tape 73 is stuck onto the surface of the display device pressing part 71 on the side of the liquid crystal display panel 51. By the close contact of the double-coated adhesive tape 73 to the peripheral part of the surface of the liquid crystal display panel 51 on the viewing side thereof, the pressing member 70 and the liquid crystal display panel 51 are fixed to each other.

Moreover, an almost rectangular frame-shaped spacer 54a, the whole of which is continuously formed, extends toward the outside so that the outer periphery thereof may be faced to the display device pressing part 71, and a first adhesive layer 544a of the spacer 54a is stuck onto the surface of the display device pressing part 71 on the viewing side thereof. Here, an almost rectangular frame-shaped base 541a, the whole of which is continuously formed, is formed and arranged to overlap with the whole of the outer periphery of the optical sheet 515 and the whole of the periphery of the aperture part 70a of the pressing member 70 from the top of the optical sheet 515 to the top of the pressing member 70 so as to include the whole of the area between the top of the optical sheet 515 and the pressing member 70. A second adhesive layer 542a is arranged between the base 541a and the viewing screen protection plate 52 from the top of the optical sheet 515 to the top of the pressing member 70. The second adhesive layer 542a is discontinuously provided not so as to overlap with the screen area 53 and to enclose the screen area 53. That is, the second adhesive layer 542a is formed of a plurality of island-shaped parts 542 arranged along the base 541a to be separated from each other with the intervals S. Each of the intervals S in the second adhesive layer 542a functions as the gaps through which the area on the inside of the second adhesive layer 542a and the area on the outside thereof communicate with each other. Thereby, the spacer 54a is led to be arranged from the top of the optical sheet 515 to the top of the pressing member 70. Furthermore, a reflection suppression member 543a and the first adhesive layer 544a in the spacer 54a extend to a position opposed to the sealing frame 40. Thereby, the reflection suppression member 543 of the spacer 54a is arranged so as to overlap with the area of a gap S1 between the viewing screen protection plate 52 and the housing 3.

A light blocking film such as a chrome plated film may be formed on the external surface of the display device pressing part 71 of the pressing member 70.

Also in the present embodiment, an un-polymerized resin is filled in the whole of the area enclosed by the spacer 54 by being pushed to be widened with the viewing screen protection plate 52 by the pressurization at the time of the manufacturing of the electronic equipment 1A, and the viewing screen protection plate 52 is stuck to the spacer 54a. At this time, the un-polymerized resin is led to protrude from the intervals S (see the dotted line part T in FIG. 5), although the amount of the protrusion is small. Even if the un-polymerized resin protrudes in this manner, it can be prevented that the un-polymerized resin flows out to the side of the optical sheet 515 to adhere to the end face of the optical sheet 515, because the base 541a of the spacer 54a is arranged from the top of the optical sheet 515 to the top of the pressing member 70 to extend to the outside of the viewing screen protection plate 52.

As described above, according to the second embodiment, the second adhesive layer 542a of the spacer 54a is formed of the plurality of island-shaped parts 542 arranged along the base 541a to be separated from each other with the intervals S similarly to the first embodiment, and consequently the area on the internal side of the second adhesive layer 542a and the area on the external side thereof communicate with each other through the intervals S. Thereby, when the un-polymerized resin in the area enclosed by the spacer 54a is pushed to be widened at the time of assembly, then the air in the area is led to pass through the intervals S, so that the area is deaerated. Besides, because the base 541a of the spacer 54a is arranged from the top of the optical sheet 515 to the top of the pressing member 70, the un-polymerized resin pushed to be widened in the aforesaid area protrudes to the top of the base 541a or the top of the pressing member 70 on the outside of the second adhesive layer 542a or the viewing screen protection plate 52. Consequently, it can be prevented that the un-polymerized resin flows out to the side of the optical sheet 515 to adhere to the end face of the optical sheet 515. Thereby, it is possible to join the liquid crystal display panel 51 and the viewing screen protection plate 52 to each other with the exertion of the harmful influences onto the optical sheet 515 by the resin layer 55 suppressed.

Moreover, because the pressing member 70 is fixed at a position which is on the outside of the screen area 53 in the transparent substrate 512 on the viewing side of the liquid crystal display panel 51 and overlaps with the viewing screen protection plate 52, the gap between the liquid crystal display panel 51 and the viewing screen protection plate 52 is led to be blockaded by the pressing member 70, and consequently the entering of external light from the gap can be prevented.

Moreover, because the spacer 54a is arranged from the top of the optical sheet 515 to the top of the pressing member 70, it becomes possible to support the spacer 54a stably.

Besides, because the reflection suppression member 543a of the spacer 54a is arranged so as to overlap with the area of the gap S1 between the viewing screen protection plate 52 and the housing 3, the reflected light entering the gaps S1 can be suppressed.

The present invention is not limited to the embodiments described above, but can be suitably modified.

Although the spacer 54a is provided so as to include the position where the base 541a overlaps with the whole of the outer periphery of the optical sheet 515 and the whole of the periphery of the aperture part 70a of the pressing member 70 from the top of the optical sheet to the top of the pressing member 70 so as to include the whole of the area between the top of the optical sheet 515 and the pressing member 70 in the second embodiment described above, the shape of the spacer 54a may be another one. For example, the spacer 54a has only to be formed and arranged in a shape including at least the position at which the base 541a overlaps with the whole of the outer periphery of the optical sheet 515 from the top thereof to the area on the outside of the optical sheet 515. That is, the base 541a of the spacer 54a may also have an aperture at a part of the area between the top of the optical sheet 515 and the pressing member 70. Also in this case, similarly to the first embodiment, it can be prevented that the un-polymerized resin pushed to be widened in the area enclosed by the spacer 54*a* between the liquid crystal display panel 51 and the viewing screen protection plate 52 flows out to the side of the optical sheet 515 to adhere to the end face thereof. Thereby, it is possible to join the liquid crystal display panel 51 and the viewing screen protection plate 52 to each other with the exertion of the harmful influences onto the optical sheet 515 by the resin layer 55 suppressed. Moreover, the second adhesive layer 542*a* has only to be arranged at least between the base 541*a* and the viewing screen protection plate 52. In this case, the second adhesive layer 542*a* has only to be provided at least at a part between the top of the optical sheet 515 and the top of the pressing member 70.

Moreover, in this case, the spacer 54*a* may be formed and arranged so as to be a shape in which the base 541*a* and the second adhesive layer 542*a* are provided at, for example, a plurality of areas in which the pressing member 70 and the viewing screen protection plate 52 are opposed to each other with the screen area 53 sandwiched between them in the area in which the pressing member 70 and the viewing screen protection plate 52 overlap with each other. Thereby, the pressing member 70 and the viewing screen protection plate 52 can be joined to each other in the area in which the pressing member 70 and the viewing screen protection plate 52 overlap with each other, and consequently the joining between the liquid crystal display panel 51 and the viewing screen protection plate 52 can be made to be firmer one by means of the pressing member 70 and the spacer 54*a*. In this case, the base 541*a* and the second adhesive layer 542*a* of the spacer 54*a* have only to be provided at least at a part of the area where the pressing member 70 and the viewing screen protection plate 52 overlap with each other.

Furthermore, if the base 541*a* of the spacer 54*a* and the second adhesive layer 542*a* are provided at both the area in which the optical sheet 515 and the viewing screen protection plate 52 overlap with each other and the area in which the pressing member 70 and the viewing screen protection plate 52 overlap with each other, then the sum of the thicknesses of the pressing member 70 and the double-coated adhesive tape 73 (the length along the normal line direction of the viewing screen protection plate 52) may also be made to be equal to the thickness of the optical sheet 515. Thereby, the steps between the respective areas mentioned above can be made to be small, and therefore the liquid crystal display panel 51 and the viewing screen protection plate 52 can be joined more stably by means of the spacer 54*a*, the pressing member 70 and the optical sheet 515.

The viewing screen protection plate 52 may be arranged on whichever external surfaces of the pair of transparent substrates 512 and 513 of the liquid crystal display panel 51 on the opposite sides of their inner surfaces facing to each other. Moreover, the protection plate integrated liquid crystal display panel 5 is not limited to be a transmissive protection plate integrated liquid crystal display panel, but may be a semi-transmissive protection plate integrated liquid crystal display panel or further a reflective protection plate integrated liquid crystal display panel, in which the surface light source unit 6 is not oppositely arranged. The base 541*a* may be formed of a member having at least adhesion.

Figure 6:
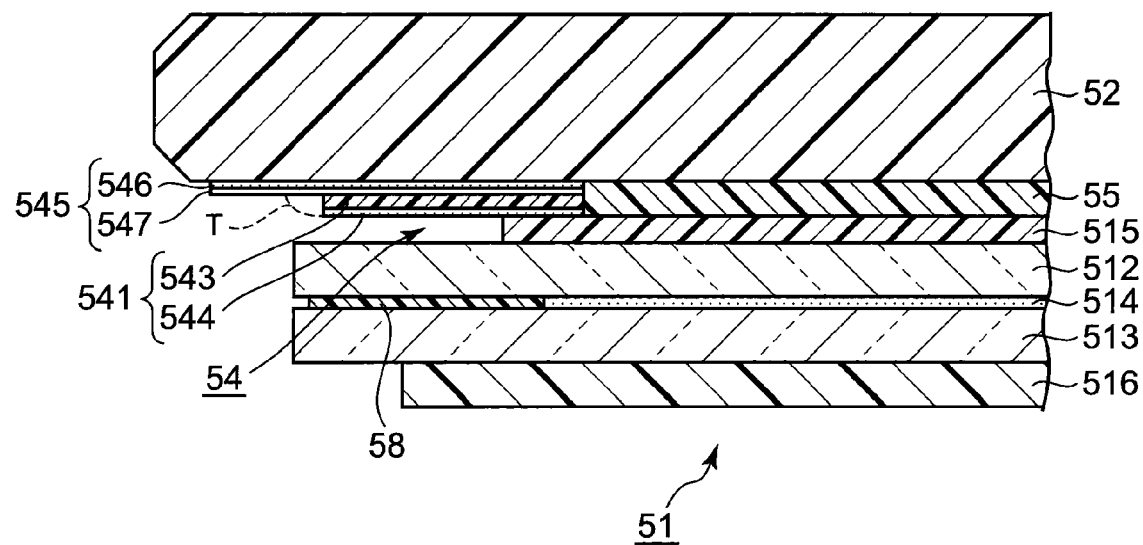
FIG. 6 is a sectional view showing the protection plate integrated liquid crystal display panel in which the second layer is formed to be two layers.

Furthermore, the base 541*a* has only to contact with the optical sheet 515 directly at least at a part of the area in which the spacer 54*a* and the optical sheet 515 overlap with each other. Moreover, the base 541*a* may include only the first adhesive layer 544*a* and the first adhesive layer 544*a* may be arranged from a contact area overlapping with the part in which the base 541*a* directly contact with the optical sheet 515 to a noncontact area which is an area adjoining the contact area and in which the base 541*a* does not directly contact with the optical sheet 515. Furthermore, the second adhesive layer 542*a* has only to have the adhesion at least at a part contacting with the viewing screen protection plate 52, and the second adhesive layer 542*a* may include a reflection suppression member. Moreover, as shown in FIG. 6 for example, a second adhesive layer 545 formed to be in two layers or more such as second adhesive layers 546 and 547 may be applied. Here, the same numeral is used in FIG. 6 to the same parts as that of the first embodiment. Moreover, the viewing screen protection plate 52 is not required to overlap with the pressing member 70. Furthermore, although both of the spacer 54*a* and the base 541*a* are designed to be an almost rectangular frame the whole of which is continuously formed, it is only necessary for the spacer 54*a* and the base 541*a* to be at least a frame the whole of which is continuously formed, and both of them are not necessary to be a rectangle.

Figure 7:
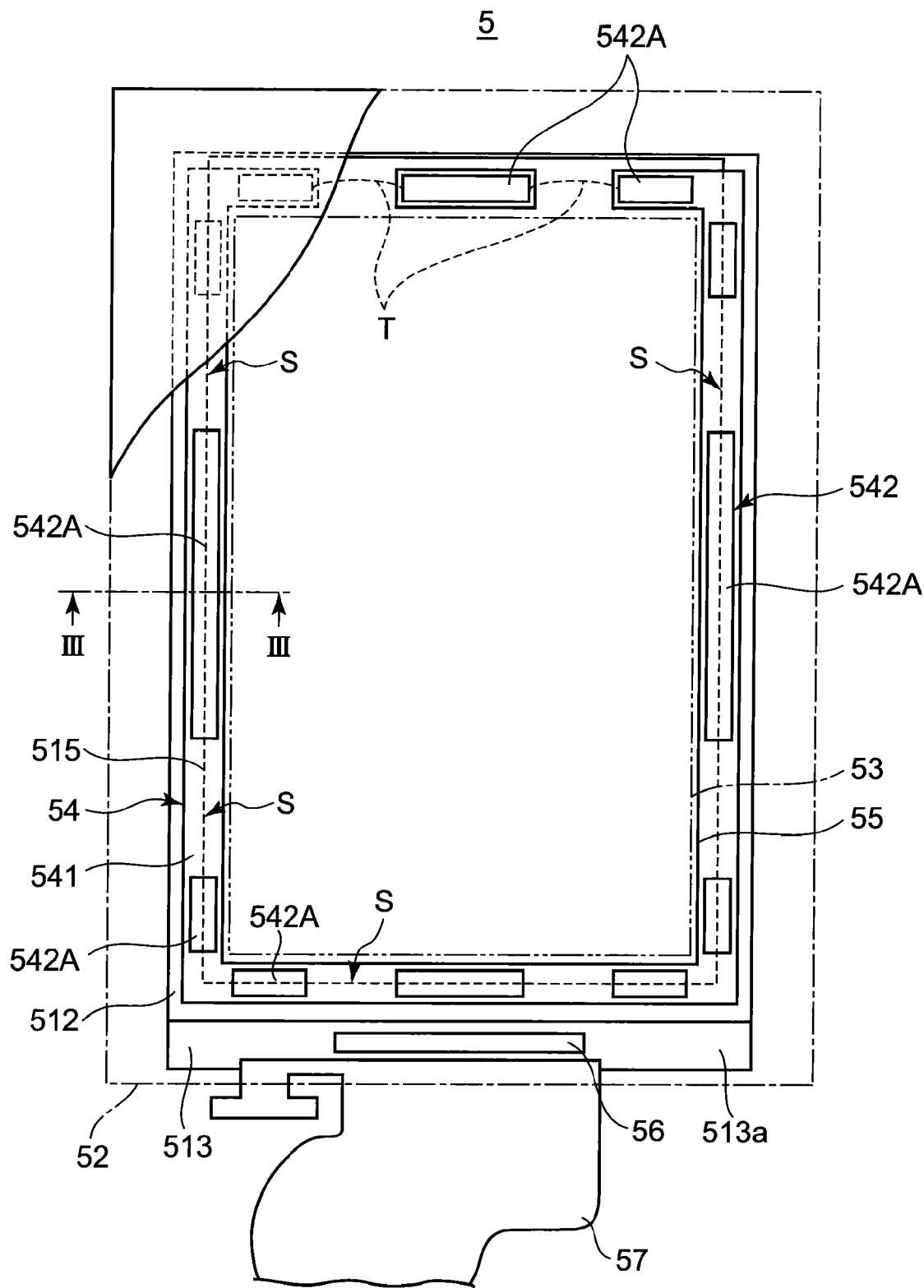
FIG. 7 is a front view showing the protection plate integrated liquid crystal display panel in which the first layer is discontinuously provided.

Moreover, because the un-polymerized resin is arranged to overlap with at least the whole of the screen area 53, the un-polymerized resin protrudes from the screen area 53 when the un-polymerized resin is pushed to be widened with the viewing screen protection plate 52. However, as shown by dotted lines T in FIG. 7 for example, the un-polymerized resin does not flows out to the side of the optical sheet 515 to adhere to the end face of the optical sheet 515 at the part where the optical sheet 515 is formed to project from the screen area 53 to be longer than the length of the protrusion of the un-polymerized resin from the screen area 53. Here, the same numeral is used in FIG. 7 to the same parts as that of the first embodiment. Consequently, as described above, if the optical sheet 515 is formed and arranged to project from the screen area 53 by the sufficient length along the direction parallel to the surface of the optical sheet 515, then the base 541*a* of the spacer 54*a* is not necessarily continuously formed between the screen area 53 and the outer periphery of the optical sheet 515 in the part corresponding to the projecting part, and may be discontinuously formed. Moreover, the spacer 54*a* is not necessarily to be formed at the part mentioned above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protection plate integrated liquid crystal display panel, comprising:
    a liquid crystal display panel including:
        first and second transparent substrates,
        a liquid crystal layer provided between the first and second transparent substrates, and
        an optical sheet that is stuck to the first transparent substrate so as to be overlapped with all of a screen area, wherein the optical sheet is larger than the screen area;
    a protection plate arranged to be opposed to the liquid crystal display panel with the optical sheet intervening between the protection plate and the first transparent substrate;
    a spacer including:
        a first layer arranged on an outside of the screen area between the optical sheet and the protection plate so as to be overlapped with all of at least one end side of the optical sheet from an area in which the first layer overlaps with the optical sheet to an area on an outside of the optical sheet, and
a second layer arranged on the outside of the screen area between the first layer and the protection plate; and
a resin layer filled up and polymerized between the liquid crystal display panel and the protection plate so as to be overlapped with all of the screen area from an area in which the spacer is arranged to an area in which the resin layer overlaps with the screen area,
wherein:
the first layer is continuously formed along all of at least one end side of the optical sheet in a contact area in which the first layer directly contacts the optical sheet, the first layer is continuously formed along all of the at least one end side of the optical sheet in a noncontact area adjoining the contact area, the first layer not contacting the optical sheet in the noncontact area, and the first layer is formed to extend from a boundary line between the contact area and the noncontact area to the area on the outside of the optical sheet in the noncontact area,
the second layer is discontinuously arranged on the first layer in the contact area or the noncontact area,
the optical sheet has a rectangular shape, and
the first layer is arranged to be overlapped with an entirety of all end sides of the optical sheet.

2. The protection plate integrated liquid crystal display panel according to claim 1, wherein the first layer directly contacts the optical sheet at least at a part of an area in which the spacer and the optical sheet overlap with each other.

3. The protection plate integrated liquid crystal display panel according to claim 1, wherein the first layer directly contacts the optical sheet in all of an area in which the spacer and the optical sheet overlap with each other.

4. The protection plate integrated liquid crystal display panel according to claim 1, wherein the first layer includes a reflection suppression member arranged from the contact area to the noncontact area to suppress reflection of external light, and a first adhesive layer arranged at least in the contact area to fix the reflection suppression member and the optical sheet.

5. The protection plate integrated liquid crystal display panel according to claim 4, wherein the first adhesive layer is arranged from the contact area to the noncontact area.

6. The protection plate integrated liquid crystal display panel according to claim 1, wherein the first layer includes a first adhesive layer arranged from the contact area to the noncontact area.

7. The protection plate integrated liquid crystal display panel according to claim 1, wherein the second layer includes a second adhesive layer directly contacting the protection plate to fix the first layer and the protection plate.

8. The protection plate integrated liquid crystal display panel according to claim 7, wherein the second layer comprises at least two layers.

9. The protection plate integrated liquid crystal display panel according to claim 7, wherein the second layer suppresses reflection of external light.

10. The protection plate integrated liquid crystal display panel according to claim 1, further comprising:
a pressing member fixed on the outside of the screen area on the first transparent substrate.

11. The protection plate integrated liquid crystal display panel according to claim 10, wherein the pressing member is arranged to be overlapped with the protection plate.

12. The protection plate integrated liquid crystal display panel according to claim 10, wherein the first layer is arranged from a top of the optical sheet to a top of the pressing member.

13. The protection plate integrated liquid crystal display panel according to claim 10, wherein the second layer is arranged at least at a part between a top of the optical sheet and a top of the pressing member.

14. The protection plate integrated liquid crystal display panel according to claim 10, wherein the spacer is arranged to overlap with all of an area between the optical sheet and the pressing member.

15. An electronic equipment, comprising:
the protection plate integrated liquid crystal display panel according to claim 10;
a surface light source unit fixed to the protection plate integrated liquid crystal display panel so as to be opposed to the liquid crystal display panel, the surface light source unit having a frame-shaped member and radiating illuminating light toward the protection plate integrated liquid crystal display panel; and
a housing including an aperture part to expose the protection plate externally, and a supporting part to support the surface light source unit, wherein the surface light source unit is fixed to the supporting part when the protection plate integrated liquid crystal display panel is housed in the housing so that the protection plate may be arranged in the aperture part, and wherein the pressing member is attached to a peripheral wall part of the frame-shaped member.

16. The protection plate integrated liquid crystal display panel according to claim 1, wherein the first layer is frame-shaped and arranged to be overlapped with all of an outer periphery of the optical sheet.

17. An electronic equipment, comprising:
the protection plate integrated liquid crystal display panel according to claim 1;
a surface light source unit fixed to the protection plate integrated liquid crystal display panel so as to be opposed to the liquid crystal display panel, the surface light source unit radiating illuminating light toward the protection plate integrated liquid crystal display panel; and
a housing including an aperture part to expose the protection plate externally, and a supporting part to support the surface light source unit, wherein the surface light source unit is fixed to the supporting part when the protection plate integrated liquid crystal display panel is housed in the housing so that the protection plate may be arranged in the aperture part.

18. The electronic equipment according to claim 17, wherein the optical sheet includes a polarizing plate and a wave plate intervening between the polarizing plate and the first transparent substrate.

19. The protection plate integrated liquid crystal display panel according to claim 1, wherein the optical sheet includes a polarizing plate and a wave plate intervening between the polarizing plate and the first transparent substrate.

20. A protection plate integrated liquid crystal display panel, comprising:
a liquid crystal display panel including:
first and second transparent substrates,
a liquid crystal layer provided between the first and second transparent substrates, and an optical sheet that is stuck to the first transparent substrate so as to be overlapped with all of a screen area, wherein the optical sheet is larger than the screen area;
a protection plate arranged to be opposed to the liquid crystal display panel with the optical sheet intervening between the protection plate and the first transparent substrate;
a spacer including:
   a first layer arranged on an outside of the screen area between the optical sheet and the protection plate so as to be overlapped with all of at least one end side of the optical sheet from an area in which the first layer overlaps with the optical sheet to an area on an outside of the optical sheet, and
   a second layer arranged on the outside of the screen area between the first layer and the protection plate; and
a resin layer filled up and polymerized between the liquid crystal display panel and the protection plate so as to be overlapped with all of the screen area from an area in which the spacer is arranged to an area in which the resin layer overlaps with the screen area,
wherein:
   the first layer is continuously formed along all of at least one end side of the optical sheet in a contact area in which the first layer directly contacts the optical sheet, the first layer is continuously formed along all of the at least one end side of the optical sheet in a noncontact area adjoining the contact area, the first layer not contacting the optical sheet in the noncontact area, and the first layer is formed to extend from a boundary line between the contact area and the noncontact area to the area on the outside of the optical sheet in the noncontact area,
   the second layer is discontinuously arranged on the first layer in the contact area or the noncontact area, and
the first layer is discontinuously provided in a part of the optical sheet which projects from the screen area so as to be longer than a length of a protrusion of the resin layer protruded from the screen area.

21. A protection plate integrated liquid crystal display panel, comprising:
   a liquid crystal display panel including:
      first and second transparent substrates,
      a liquid crystal layer provided between the first and second transparent substrates, and
      an optical sheet that is stuck to the first transparent substrate so as to be overlapped with all of a screen area, wherein the optical sheet is larger than the screen area;
   a protection plate arranged to be opposed to the liquid crystal display panel with the optical sheet intervening between the protection plate and the first transparent substrate;
   a spacer including:
      a first layer arranged on an outside of the screen area between the optical sheet and the protection plate so as to be overlapped with all of an outer periphery of the optical sheet from an area in which the first layer overlaps with the optical sheet to an area on an outside of the optical sheet, wherein an entirety of the first layer is formed in a continuous frame, and
      a second layer arranged on the outside of the screen area between the first layer and the protection plate; and
   a resin layer filled in an area enclosed by the spacer and polymerized therein between the liquid crystal display panel and the protection plate,
   wherein:
      the first layer is formed in the frame, which continuously encloses the screen area in a contact area in which the first layer directly contacts the optical sheet, the first layer is formed in a shape that extends from the contact area to the area on the outside of the optical sheet in a noncontact area in which the first layer does not contact the optical sheet, and the first layer is formed in a shape that extends from a boundary line between the contact area and the noncontact area to the area on the outside of the optical sheet in the noncontact area, and
      the second layer is discontinuously arranged on the first layer in the contact area or the noncontact area.

* * * * *